United States Patent
Lee et al.

(10) Patent No.: US 11,035,950 B2
(45) Date of Patent: Jun. 15, 2021

(54) MILLIMETER-WAVE DETECT OR REFLECT ARRAY

(71) Applicant: Keysight Technologies, Inc., Santa Rosa, CA (US)

(72) Inventors: Gregory S. Lee, Mountain View, CA (US); Paul L. Corredoura, Redwood City, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 16/778,648

(22) Filed: Jan. 31, 2020

(65) Prior Publication Data

US 2021/0055411 A1 Feb. 25, 2021

Related U.S. Application Data

(63) Continuation-in-part of application No. 16/547,681, filed on Aug. 22, 2019.

(60) Provisional application No. 62/751,796, filed on Oct. 29, 2018.

(51) Int. Cl.
*H01Q 21/06* (2006.01)
*H01Q 9/04* (2006.01)
*G01S 13/89* (2006.01)
*G01S 7/40* (2006.01)

(52) U.S. Cl.
CPC ............. *G01S 13/89* (2013.01); *G01S 7/4026* (2013.01); *H01Q 9/0407* (2013.01); *H01Q 21/065* (2013.01)

(58) Field of Classification Search
CPC ...... H01Q 3/26; H01Q 3/2605; H01Q 3/2611; H01Q 3/2629; H01Q 3/2636; H01Q 3/2641; H01Q 3/2658; H01Q 19/06; H01Q 19/10; H01Q 19/104; H01Q 15/0006;
(Continued)

(56) References Cited

U.S. PATENT DOCUMENTS 5,170,169 A   12/1992   Stephan
6,037,905 A   3/2000    Koscica et al.
(Continued)

OTHER PUBLICATIONS

Shinya Kitagawa et al., "Study on RCS Reduction of Patch Array Using Switchable Absorption/Tranmission Surface", IEICE Trans. Electron., vol. E99-C, No. 7, Jul. 2016, pp. 805-808.
(Continued)

*Primary Examiner* — Jason Crawford

(57) ABSTRACT

A device for detecting and selectively reflecting an incident microwave signal or millimeter-wave signal is disclosed. The device includes a plurality of antennae disposed in an array; and a diode disposed at each input of each antenna, each diode having an input adapted to selectively receive a reverse bias signal, or a zero bias signal, or a forward bias signal. The device also includes a switching device connected to each input, and configured to selectively apply the forward bias signal, or the reverse bias signal or the zero bias signal to each of the diodes. In forward bias, each of the plurality of antennae reflects the incident microwave signal or millimeter wave signal; and in zero bias or reverse bias each of the plurality of antennae detects the incident microwave signal or millimeter wave signal.

19 Claims, 13 Drawing Sheets

(58) Field of Classification Search
CPC .. H01Q 15/0013; H01Q 15/002; H01Q 1/247; H01Q 1/3233
See application file for complete search history.

(56) References Cited

U.S. PATENT DOCUMENTS

| | | | |
|---|---|---|---|
| 7,746,266 B2* | 6/2010 | Zoughi | G01S 13/887 342/22 |
| 10,243,412 B1* | 3/2019 | Fink | H02J 7/025 |
| 2003/0011528 A1* | 1/2003 | Marchand | H01Q 9/16 343/793 |
| 2007/0195004 A1* | 8/2007 | Rebeiz | H01Q 3/245 343/876 |
| 2008/0150800 A1* | 6/2008 | Tsuji | H01Q 21/08 342/368 |
| 2010/0045561 A1* | 2/2010 | Ratajczak | H01Q 15/24 343/834 |
| 2011/0050499 A1* | 3/2011 | Jun | H01Q 3/22 342/375 |
| 2014/0231627 A1* | 8/2014 | Wakatsuki | H04B 7/06 250/208.2 |
| 2019/0128999 A1* | 5/2019 | Horst | G01S 13/9011 |
| 2020/0021370 A1* | 1/2020 | Huynh | H04B 17/17 |
| 2020/0136263 A1* | 4/2020 | Lee | G01S 7/4004 |

OTHER PUBLICATIONS

Akiko Kohmura et al."Prototype Measurement of Active Reflectarray Antenna using a Diode Grid in the W-band", Proceedings of ISAP2016, Okinawa, Japan, 2016, pp. 822-823.

Chinese Notice of Decision to Grant Received dated Sep. 28, 2020 with English translation for Chinese App. No. 201921731502.6, 4 pgs.

Notice of Allowance dated Dec. 16, 2020, for U.S. Appl. No. 16/547,681, 21 pgs.

* cited by examiner

MILLIMETER-WAVE DETECT OR REFLECT ARRAY

CROSS REFERENCE TO RELATED APPLICATIONS

This application is a continuation-in-part under 37 C.F.R. § 1.53(b) of commonly owned U.S. patent application Ser. No. 16/547,681 to Lee, et al. entitled "Millimeter-Wave Detect or Reflect Array" filed on Aug. 22, 2019 The present application claims priority under 35 U.S.C. § 120 to U.S. patent application Ser. No. 16/547,681, the disclosure of which is hereby incorporated by reference in its entirety. The present application also claims priority under 35 U.S.C. § 119(e) to U.S. Provisional Application No. 62/751,796, filed on Oct. 29, 2018, and naming Gregory S. Lee, et al. inventors. The entire disclosure of U.S. Provisional Application No. 62/751,796 is hereby specifically incorporated by reference in its entirety.

BACKGROUND

Automotive radars are currently deployed in autos for assistance in parking and collision avoidance. Additionally, driverless cars are currently being developed, and these types of cars may incorporate such automotive radars. While light detections and ranging (LIDAR) may play a role in this scenario, it is generally conceded that radar has the clear advantage in fog and offers the unique ability to determine relative velocity due to the Doppler effect. Each car may be equipped with as many as a dozen automotive radar modules around the perimeter of the car. Thus, auto manufacturers are preparing for when they will soon be installing millions of radar units inside car bodies (in the bumpers, doors, etc.).

Auto radars mainly operate near 77 GHz, although there are short range radars (SRRs) at 24 GHz and there may be future radars operating at 120 GHz. At all these millimeter-wave frequencies, the thickness of the plastic composites used in the car bumpers and doors is comparable to or larger than the wavelength. Furthermore, this thickness is not very tightly controlled (from an electromagnetic radiation standpoint) and the surfaces are highly curved. These factors imply that the directional performance of a radar module as tested before it is installed in the car part will change after installation.

Particularly, direction of arrival (DOA) of a target is an important parameter to estimate, especially for mid-range radars (MRRs) and long-range radars (LRRs). For long-range radars the desired azimuthal accuracy is 0.1°. Car manufacturers now mechanically translate corner reflectors as test targets to test the installed radar accuracy. The corner reflector distance must be at least 1 m to avoid deleterious diffraction/scattering effects from its edges and outer walls. A shorter test distance would be desirable as this would save space on the automotive assembly line. There is a tradeoff between positioning accuracy, needed to establish the rigorous relative angle, and demands for speed typical of assembly lines to maintain throughput. Multi-target testing in an assembly line environment has been discussed, but slinging multiple corner reflectors around in such an environment becomes even more problematic.

All scenarios envision the mid-range radars placed in the bumper corners, four per vehicle. The plastic curvature is so high in these areas that the corners act as uncontrolled millimeter-wave lenses. For these radar units, even the raw transmit beams may be severely distorted. Thus, analogous to the "headlight tweaking" that to which the auto industry is accustomed, carmakers envision tweaking the transmit arrays of installed radars to compensate for beam skew. At present, they have no method to measure the installed module transmit pattern that is sufficiently inexpensive, small, and fast.

Notably, space, time, and cost are of such concern on the vehicle assembly line that a system/method that can test both the radar transmit beam pattern and its full (transmit/receive roundtrip) angular accuracy is highly desirable. If separate test equipment is needed to test the various radar functionalities, one can appreciate that assembly line space is wasted and testing time and cost increase.

Moreover, the cars discussed above are assumed to be pristine vehicles that are just being readied to ship. Upon ownership, accidents or just plain denting will occur so body work will be needed. For example, one or more radars may be damaged in an accident and need replacing. Even if all the car's radars survive intact, new bumpers, new paint, etc. will change their performance. A typical body shop can less afford equipment cost, time, and space than an assembly line, yet "radar touchup" will be required. One can appreciate that the needs highlighted in the previous paragraphs become even more acute.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the present disclosure.

The terminology used herein is for purposes of describing particular embodiments only and is not intended to be limiting. As used in the specification and appended claims, the singular forms of terms 'a', 'an' and 'the' are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to", "coupled to", or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

Figure 1A:
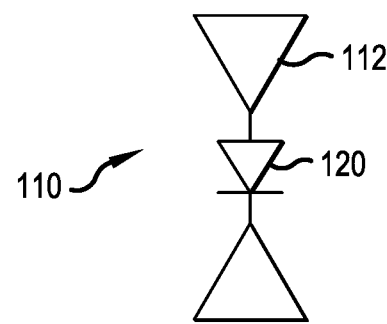
FIG. 1A illustrates an antenna-diode pair for an antenna-coupled diode used in a two-dimensional array of antenna-coupled diodes, in accordance with a representative embodiment.

FIG. 1A illustrates an antenna-diode pair for an antenna-coupled diode used in a two-dimensional array of antenna-coupled diodes, in accordance with a representative embodiment.

In FIG. 1A, the antenna-diode pair 110 includes an antenna 112 and a diode 120. The diode 120 is coupled to the antenna 112 and is therefore an antenna-coupled diode. As described more fully below, the diode 120 may be a Schottky diode and the antenna 112 may be a patch antenna.

Figure 1B:
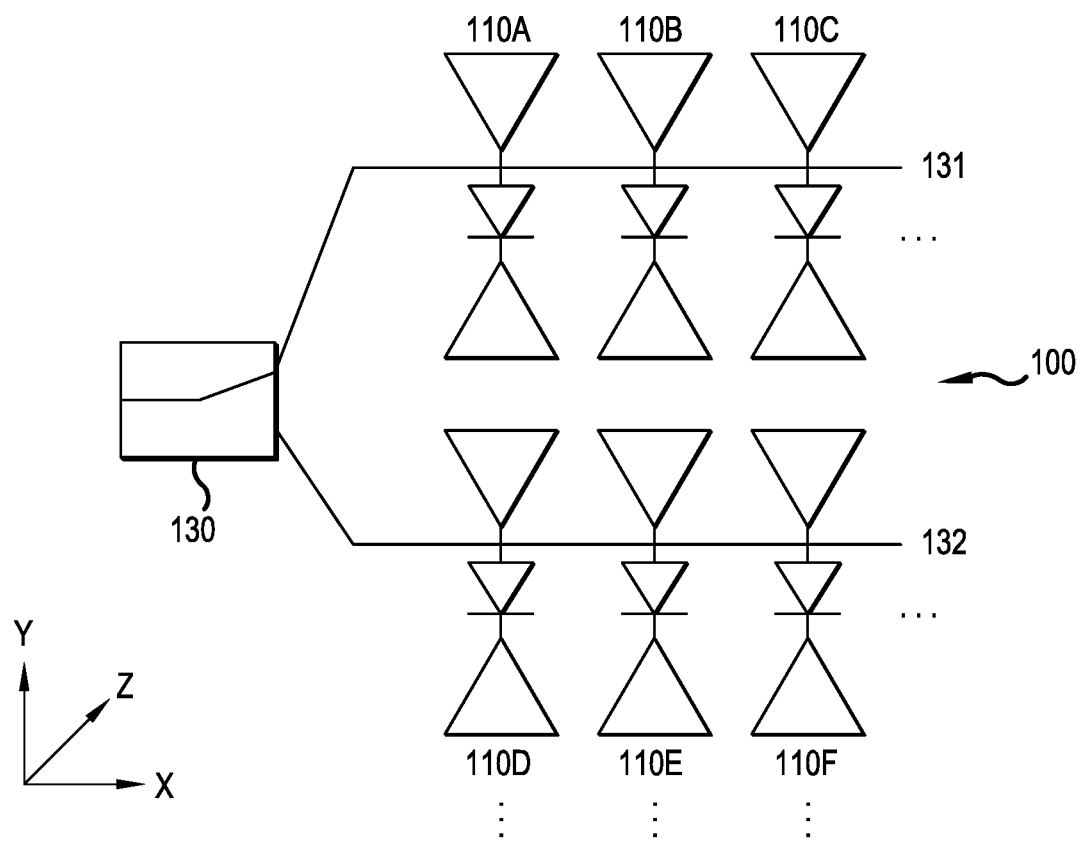
FIG. 1B illustrates a two-dimensional array of antenna-diode pairs used in a two-dimensional array of antenna-coupled diodes, in accordance with a representative embodiment.

FIG. 1B illustrates a two-dimensional array of antenna-diode pairs used in a two-dimensional array of antenna-coupled diodes, in accordance with a representative embodiment.

In FIG. 1B, an antenna-diode pair array 100 includes antenna-diode pair 110A, antenna-diode pair 110B, antenna-diode pair 110C, antenna-diode pair 110D, antenna-diode pair 110E, and antenna-diode pair 110F. The view in FIG. 1B is the top view of the antenna-diode pair array 100, corresponding to the X (width) dimension and the Y (height) direction. The antenna-diode pair array 100 is shown as a two-dimension array of antenna-diode pairs in FIG. 1B. The antenna-diode pair array 100 is coupled to a switching device 130 which is used to individually control the antenna-diode pairs 110 of the antenna-diode pair array 100. The switching device 130 includes or is coupled to first signal line 131 and second signal line 132. The first signal line 131 and the second signal line 132 may carry signals to individually control the antenna-diode pairs 110 of the antenna-diode pair array 100.

Insofar as the antenna-diode pair array 100 includes both antennae and diodes, the antenna-diode pair array 100 also includes multiple antennae disposed in an array and multiple diodes disposed in an array. Each antenna in the antenna-diode pair array 100 includes an input adapted to selectively receive a forward bias signal, or a zero bias signal, or reverse bias signal. Each diode in the antenna-diode pair array 100 is disposed at an input of a corresponding antenna. The switching device 130 is connected to each input and is configured to selectively apply a forward bias or zero bias or reverse bias to each of the diodes. In zero bias or reverse bias, each of the antennae in the antenna-diode pair array 100 detects (i.e., receives) the incident microwave signal or millimeter wave signal. In forward bias each of the antennae in the antenna-diode pair array 100 reflects the incident microwave signal or millimeter wave signal. Stated somewhat differently, each diode in the antenna-diode pair array is configured to receive a bias, and depending on the bias, and the antenna is made to detect (receive) or reflect depending on the bias. To receive (i.e., detect) the bias at the diode of each antenna-diode pair array 100 is either zero-biased or reverse-biased. To reflect each diode of the antenna-diode pair array 100 the diode is forward biased.

Notably, throughout this disclosure the signals of a DUT being tested are often referred to as either millimeter wave or microwave signals. It is emphasized that this is merely illustrative, and the present teachings are not limited to testing DUTs that emit at these wavelengths. More generally, the DUTs contemplated for testing according to the present teachings can emit signals in the radio frequency (RF) band. As such, the detect or reflect arrays for testing a DUT according to the present teachings are contemplated for operation at frequencies of the RF band.

Although the antenna-diode pair array 100 is shown in FIG. 1B to include six antenna-diode pairs 110, an antenna-diode pair array 100 may include many more than six antenna-diode pairs 110. The antenna-diode pairs 110 of the antenna-diode pair array 100 may be arranged in rows and columns and may be controlled individually and/or in the rows and/or columns. That is, the antenna-diode pair array 100 may include a series of rows and a series of columns. The antenna-diode pairs 110 in each of the series of rows may be addressable by the switching device 130. In forward bias, the addressed rows may detect the incident microwave signal or millimeter wave signal. In forward bias, the addressed rows reflect the incident microwave signal or millimeter wave signal. Additionally, the antenna-diode pairs 110 in each of the series of columns may be addressable by the switching device 130. In zero or reverse bias, the addressed columns detect the incident microwave signal or millimeter wave signal. In forward bias, the addressed columns reflect the incident microwave signal or millimeter wave signal.

In FIG. 1B, bias/sense address lines are not shown in the antenna-diode pair array 100. Each of antenna-diode pair 110A, antenna-diode pair 110B, antenna-diode pair 110C, antenna-diode pair 110D, antenna-diode pair 110E, and antenna-diode pair 110F can either be left at zero or reverse bias to operate in detect mode, or forward biased to operate in reflect mode. The individual antenna-diode pairs 110 may be spaced about one-half wavelength. Alternatively, the individual antenna-diode pairs 110 may be spaced from one another by approximately one quarter wavelength. Whether the spacing of the antenna-diode pairs 110 is approximately one-half wavelength or approximately one-quarter wavelength, the wavelength used as a reference is the wavelength of the microwave signal or millimeter wave signal. Additionally, when the spacing is one-half wavelength, the device under test (DUT) which emits the microwave signal or millimeter wave signal may transmit a single beam such as a single main beam.

At sufficient forward bias, each diode 120 is effectively a short circuit. In the mode with the sufficient forward bias, the corresponding antenna simply reflects the locally impinging radiation. By forward biasing selected elements while leaving the remainder of the antenna-diode pairs 110 of the antenna-diode pair array 100 at zero bias or reverse bias, a local mirror (or mirrors) is created because the antenna-diode pair 110 at zero or reverse bias act like absorbers. The mirror(s) electronically created using the antenna-diode pair array 100 acts as the test target.

One can electronically change the position, size, shape, and number of mirrors extremely quickly and precisely because there are no moving parts. Changing the mirror position is simply a matter of electronically addressing the desired element(s) to put into forward bias. The effective mirror size, which may be important as carmakers test radar cross section (RCS), is determined by the number of contiguous elements in forward bias. If any of the following criteria is satisfied, neighbor elements act from an RF standpoint as if they are continuous rather than discrete:

1. Spacing is $\lambda/4$ or less.
2. Device under test (DUT) transmits a single main beam and spacing is $\lambda/2$ or less.
3. Array is at least $D^2/\lambda$ away from the radar and spacing is $\lambda/2$ or less.

Here D is the diameter of the larger of the transmit and receive arrays constituting the radar being tested and $\lambda$ is the wavelength. In practice, both the latter two criteria are met. For example, when D≅28 mm for $\lambda$=3.92 mm (the wavelength at 76.5 GHz), meaning $D2/\lambda$=0.2 m. This is well below the present testing distance with corner reflectors of 1 m or more; furthermore, radars today look for multiple targets by using advanced signal processing algorithms rather than by transmitting multi-beam patterns. Hence, $\lambda/2$ spacing in the two-dimensional array may suffice.

It is also beneficial in some instances to test the shape of an object in a vehicle's path. By the present teachings, shapes can be emulated by choosing a piecewise linear perimeter for the contiguous set of antenna-diode 110 pair of the antenna-diode pair array 100 that closely matches the desired smooth shape. Finally, multi-target testing may become necessary; the number of mirrors is simply the number of separate contiguous forward bias zones in the array.

In FIG. 1B, an antenna-diode pair array 100 includes an array of (patch) antenna-coupled diodes. Each element in the antenna-diode pair array 100 is an antenna—diode pair and can be operated in either a detection mode or a reflection mode. Each antenna 112 in the antenna-diode pair array 100 may be spaced approximately one-half wavelength apart from each adjacent antenna in the antenna-diode pair array 100 in each of two lateral dimensions. Each diode 120 may be a zero bias Schottky diode. At zero bias one can use a zero bias Schottky diode as a video or square law detector. In this mode, each antenna-diode pair 110 functions as a well-known rectenna, which stand for "rectifying antenna." The antenna-diode pair 110 outputs a rectified voltage in proportion to the power locally received by the antenna 112 of the antenna-diode pair 110. Since each antenna-diode pair 110 is in an antenna-diode pair array 100, the two-dimensional addressing of the rectified voltages provides a global radiation power image—thus providing a millimeter-wave camera. This "camera" can be used to image the transmit radiation pattern, e.g., from a radar installed in the corner of a car bumper or other body part.

Figure 2B:
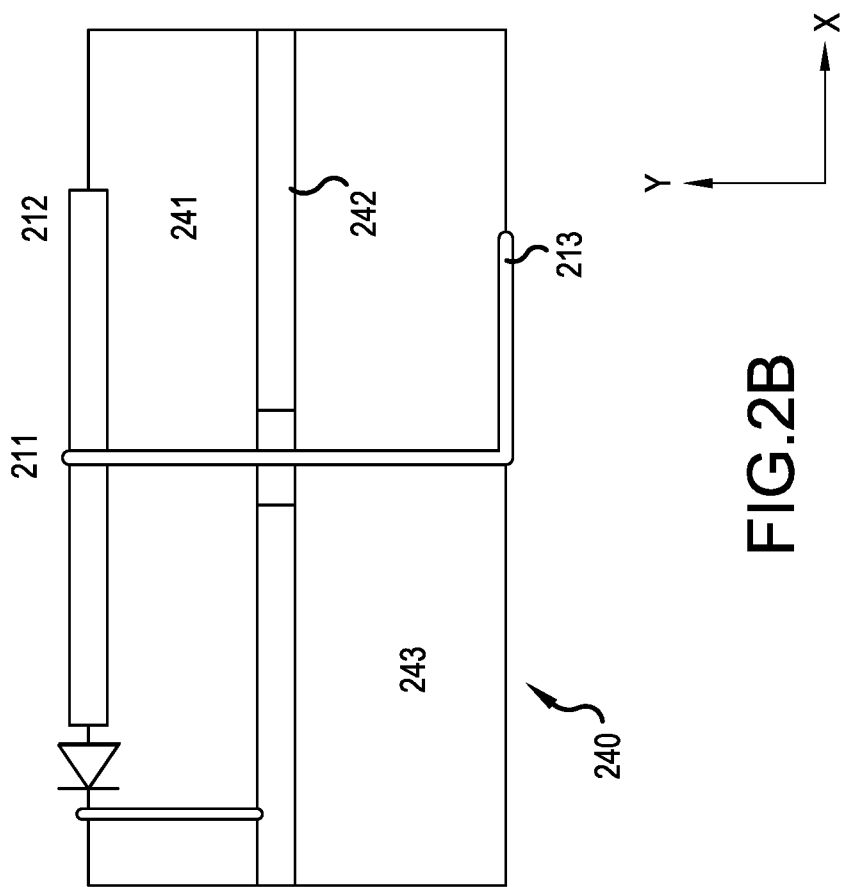
FIG. 2B illustrates a front view of geometry of the antenna-diode pair with the tapped antenna on a printed circuit board of FIG. 2A, in accordance with a representative embodiment.
Figure 2A:
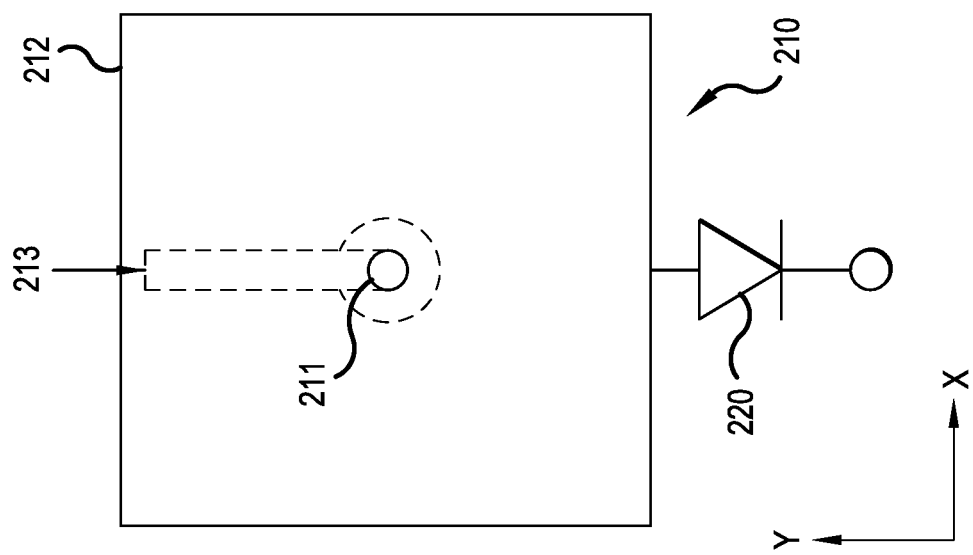
FIG. 2A illustrates a top view of geometry of an antenna-diode pair with a tapped antenna on a printed circuit board, in accordance with a representative embodiment.

FIG. 2A illustrates a top view of geometry of a patch antenna-diode pair with a tapped patch antenna on a printed circuit board, in accordance with a representative embodiment.

In FIG. 2A, a patch antenna-diode pair 210 includes a patch antenna 212 and a diode 220. An input 211 is shown as a circle at or near the center of the patch antenna 212, and a bias/sense line 213 that ends at the input 211 is outlined by broken segments. The diode 220 is connected with or otherwise coupled to the patch antenna 212 to form the patch antenna-diode pair 210.

While printed circuit board (PCB) technology is becoming very popular for various microwave applications, in the millimeter-wave band, patch antennas cannot be directly put onto conventional FR-4 material since it is too lossy. However, designs with patch antenna arrays on low-loss laminate material stacked with FR-4 into multilayer boards may be implemented. Surface mount diodes, commonly used at lower frequencies, are beginning to appear at millimeter-wave frequencies. FIG. 2B illustrates a view that includes a PCB 240 with FR-4 and low-loss laminate layers.

FIG. 2B illustrates a front view of geometry of the antenna-diode pair with the tapped antenna on a printed circuit board of FIG. 2A, in accordance with a representative embodiment.

In FIG. 2B, the bias/sense line 213 that ends at the input 211 is shown rising through a printed circuit board to end at the antenna 212. The printed circuit board includes, in order, an FR-R material 243, a ground layer 242, and a low-loss laminate 241.

In FIG. 2A, the view from the top is defined by the X (width) and Y (depth) directions. In FIG. 2B, the view from the front is defined by the X (width) and Z (height) directions.

In FIGS. 2A and 2B a simple method is shown for single-ended addressing of each patch antenna-diode pair that avoids inductive choking.

A symmetry feature of patch antennas is invoked in FIGS. 2A and 2B. Namely, the center of the antenna 212 (patch antenna) is an RF voltage null. A tap via delineated as a circle bounded by broken lines in FIG. 2A is placed at this central point, so that the diode 220 can be biased or the rectified voltage of the diode 220 can be sensed without disturbing the RF fields or allowing them to leak onto the bias/sense line 213. In other words, an input of the antenna 212 is disposed at a center-tap of the antenna 212, and this may be true of each antenna in the antenna-diode pair array 100. Bringing the tap via through the ground layer 242 (RF ground plane) and out the backside of the PCB 240 allows isolation of all bias/sense signals from the radiation. The measuring in the detecting mode may include measuring only a direct current voltage at the center tap, as the magnitude of the direct current voltage will be proportional to the magnitude of the microwave signal or millimeter wave signal from the DUT. All layers of the PCB 240 beneath the ground layer 242 (RF ground plane) can be FR-4 since only layers starting with and above the ground layer 242 (RF ground plane) are relevant to the millimeter waves.

In reality, the diode 220 placed at the RF feed point of the antenna 212 may slightly break the symmetry. This effect can be modelled with software that simulates electromagnetic effects, and the effect can be compensated by a slight offset in the position of the tap via. In practice at 77 GHz, this offset winds up being less than a mil in the direction opposite the diode 220.

Figure 3A:
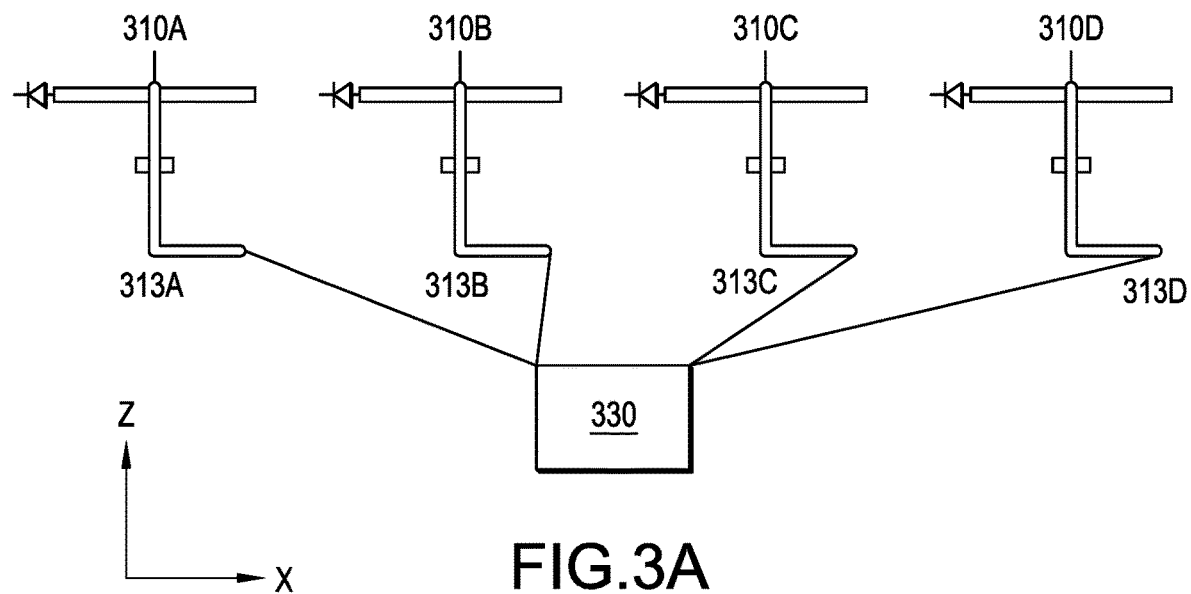
FIG. 3A illustrates a front view of a two-dimensional array of antenna-diode pairs used in a two-dimensional array of antenna coupled diodes, in accordance with a representative embodiment.

FIG. 3A illustrates a front view of a two-dimensional array of antenna-diode pairs used in a two-dimensional array of antenna coupled diodes, in accordance with a representative embodiment.

In FIG. 3A, a first antenna-diode pair 310A, a second antenna-diode pair 310B, a third antenna-diode pair 310C, and a fourth antenna-diode pair 310D form a row of antenna-diode pairs in the antenna-diode pair array 100 in the X (width) direction. A first bias/sense line 313A, a second bias/sense line 313B, a third bias/sense line 313C, and a fourth bias/sense line 313D respectively end in the inputs to the first antenna-diode pair 310A, a second antenna-diode pair 310B, a third antenna-diode pair 310C, and a fourth antenna-diode pair 310D. A switching device 330 switches the first bias/sense line 313A, the second bias/sense line 313B, the third bias/sense line 313C, and the fourth bias/sense line 313D between biasing and sensing either individually or as a row.

The row shown in FIG. 3A is representative of multiple rows in an antenna-diode pair array 100. Additionally, while only four antenna-diode pairs are shown in FIG. 3A, it will be understood that rows of the antenna-diode pair array 100 may include more than four antenna-diode pairs or fewer than four antenna-diode pairs without departing from the spirit of the teachings of the present disclosure.

Figure 3B:
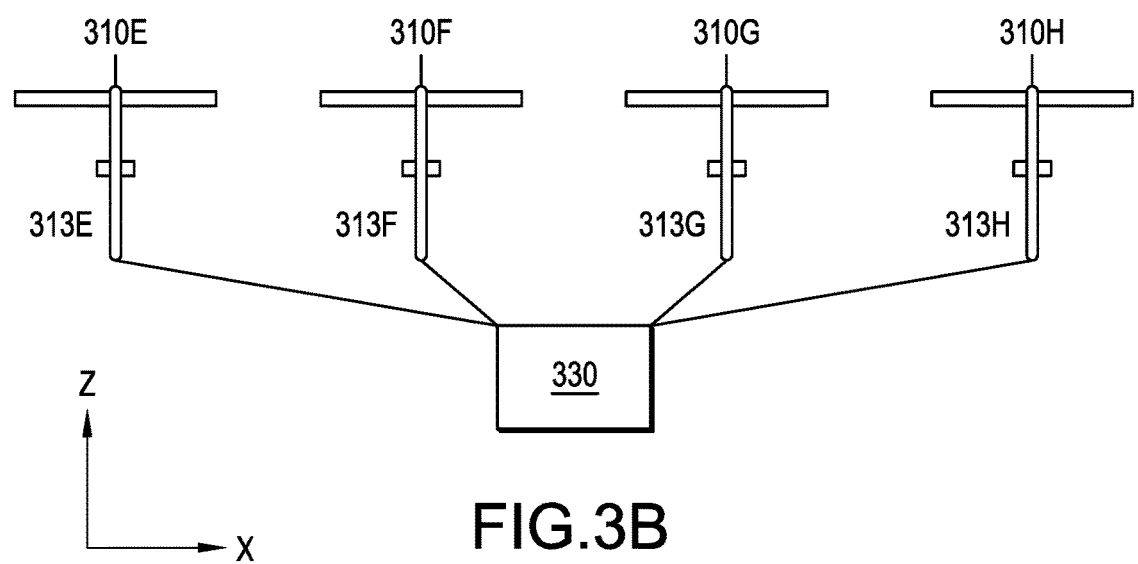
FIG. 3B illustrates a side view of the two-dimensional array of antenna-diode pairs used in a two-dimensional array of antenna coupled diodes of FIG. 3B, in accordance with a representative embodiment.

FIG. 3B illustrates a side view of the two-dimensional array of antenna-diode pairs used in a two-dimensional array of antenna coupled diodes of FIG. 3B, in accordance with a representative embodiment.

In FIG. 3B, a fifth antenna-diode pair 310E, a sixth antenna-diode pair 310F, a seventh antenna-diode pair 310G, and an eighth antenna-diode pair 310H form a column of antenna-diode pairs in the antenna-diode pair array 100 in the Z (depth) direction in the depicted coordinate system. A fifth bias/sense line 313E, a sixth bias/sense line 313F, a seventh bias/sense line 313G, and an eighth bias/sense line 313H respectively end in the inputs to the fifth antenna-diode pair 310E, the sixth antenna-diode pair 310F, the seventh antenna-diode pair 310G, and the eighth antenna-diode pair 310H. A switching device 330 switches the fifth bias/sense line 313E, the sixth bias/sense line 313F, the seventh bias/sense line 313G, and the eighth bias/sense line 313H between biasing and sensing either individually or as a column.

The column shown in FIG. 3B is representative of multiple columns in an antenna-diode pair array 100. Additionally, while only four antenna-diode pairs are shown in FIG. 3B, it will be understood that columns of the antenna-diode pair array 100 may include more than four antenna-diode pairs or fewer than four antenna-diode pairs without departing from the spirit of the teachings of the present disclosure.

Figure 4:
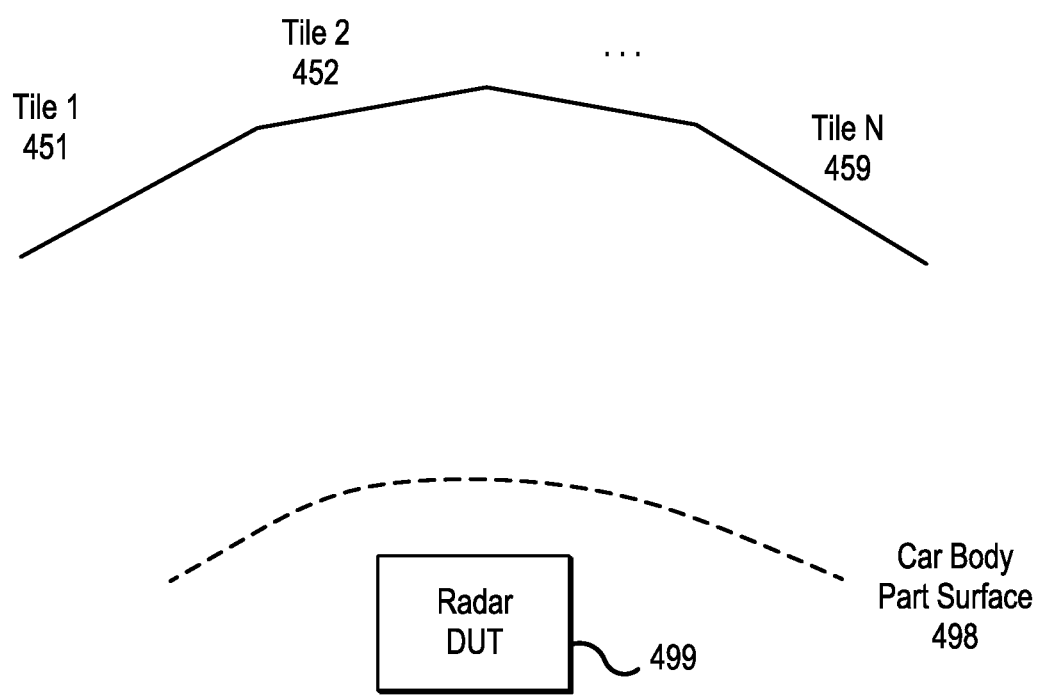
FIG. 4 illustrates a piecewise flat surface on which subarrays of the two-dimensional array of FIG. 1B are fabricated, in accordance with a representative embodiment.

FIG. 4 illustrates a piecewise flat surface on which subarrays of the two-dimensional array of FIG. 1B may be fabricated, in accordance with a representative embodiment.

For retroreflection, it may be desirable to fabricate the antenna-diode pair array 100 as a two-dimensional array on a curved surface. Notably, 'perfect' retroreflection is not necessary. For example, a corner reflector can be imperfect due to diffraction/scattering effects. Moreover, real targets are not typically perfect retroreflectors. Accordingly, a curved surface of a car body part surface 498 can be coarsely approximated with a piecewise flat surface as shown by the tiles including Tile 1 451, Tile 2 452 up to Tile N 459 as in in FIG. 4. The tiles from Tile 1 451 to Tile N 459 may be flat subarray tiles arranged to inscribe or circumscribe either a sphere or a cylinder, creating a piecewise flat sphere or a piecewise flat cylinder, respectively. In other words, in FIG. 4, multiple arrays of antennae are provided by the tiles from Tile 1 451 to Tile N 459. Each of the multiple arrays may be considered a sub-array, and each of the multiple arrays of antennae are substantially flat but together form a curved array when placed adjacent to each other. Even though the resultant array is curved, the array may still be considered a two-dimensional array in that the elements of the array are still arranged in two dimensions in each sub-array. For near-term vehicle radars, only azimuth accuracy needs to be tested so the cylindrical (rather than the more involved spherical) version of the piecewise flat surface may suffice. The center of the cylinder/sphere outlined partially by the piecewise flat surface should be the approximate center of the radar DUT 499. Since car radars are bistatic, meaning the transmit array is offset from the receive array, the approximate center is roughly the mean of the geometric centers.

In FIG. 4, each tile is a two-dimensional subarray. The car body part surface is arbitrary, and depends on the body part, its fabrication tolerance, and whether it is dented or not, among other considerations.

Figure 5:
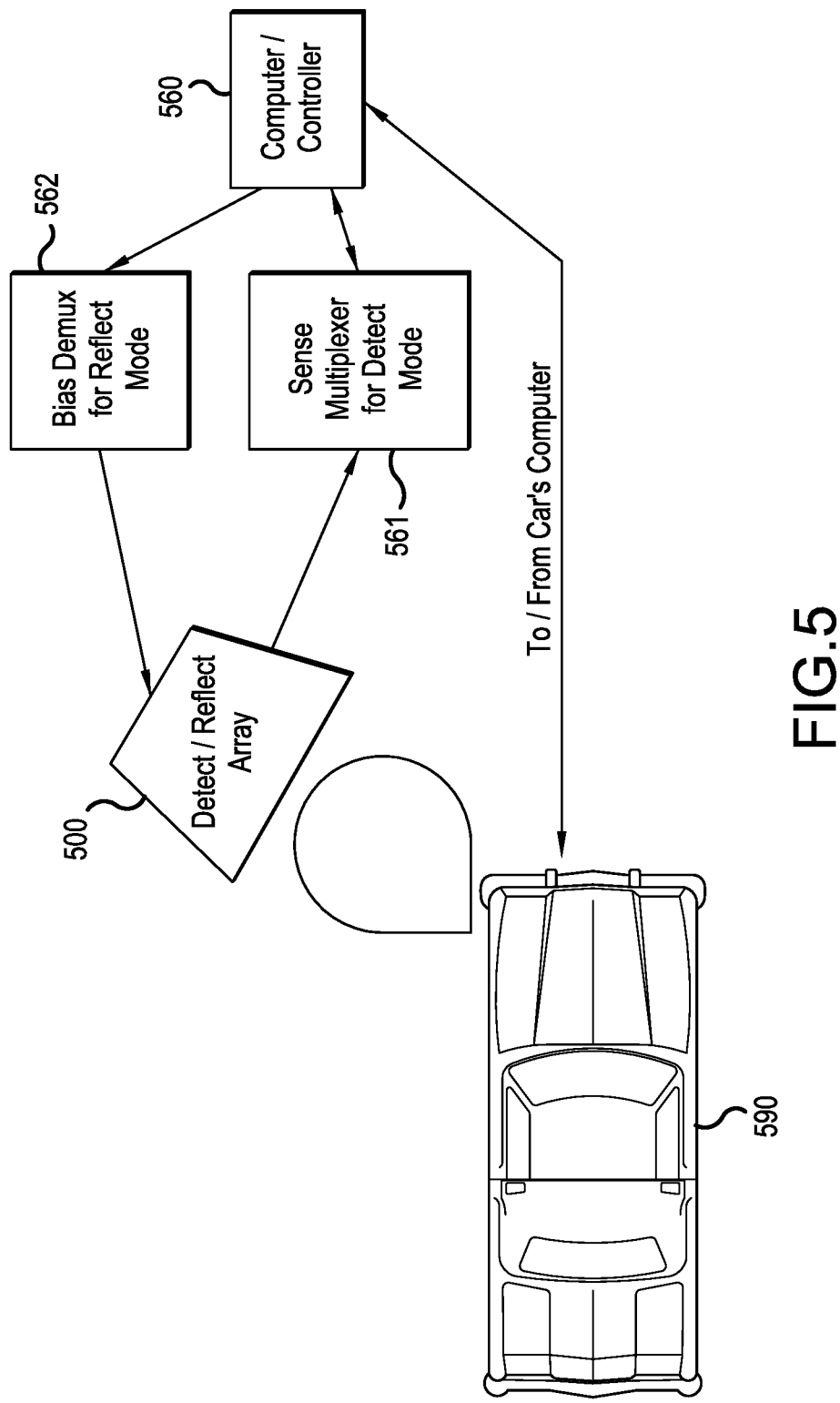
FIG. 5 illustrates a flow for testing an installed automotive arrangement, in accordance with a representative embodiment.

FIG. 5 illustrates a flow for testing an installed automotive arrangement, in accordance with a representative embodiment.

In the embodiment of FIG. 5, testing of a radar for a car 590 is illustrated. In transmit and detect modes, a computer (not shown) of the car 590 may communicate with a computer/controller 560 used for testing. The computer of the car 590 communicates a desired test sequence to the computer/controller 560 the radar for the car 590, and the computer/controller 560 arranges the appropriate test. For example, the computer of the car 590 inform the computer/controller 560 that the radar for the car 590 is transmitting a beam at 48° azimuth, and the computer/controller 560 then arranges the test.

Figure 6:
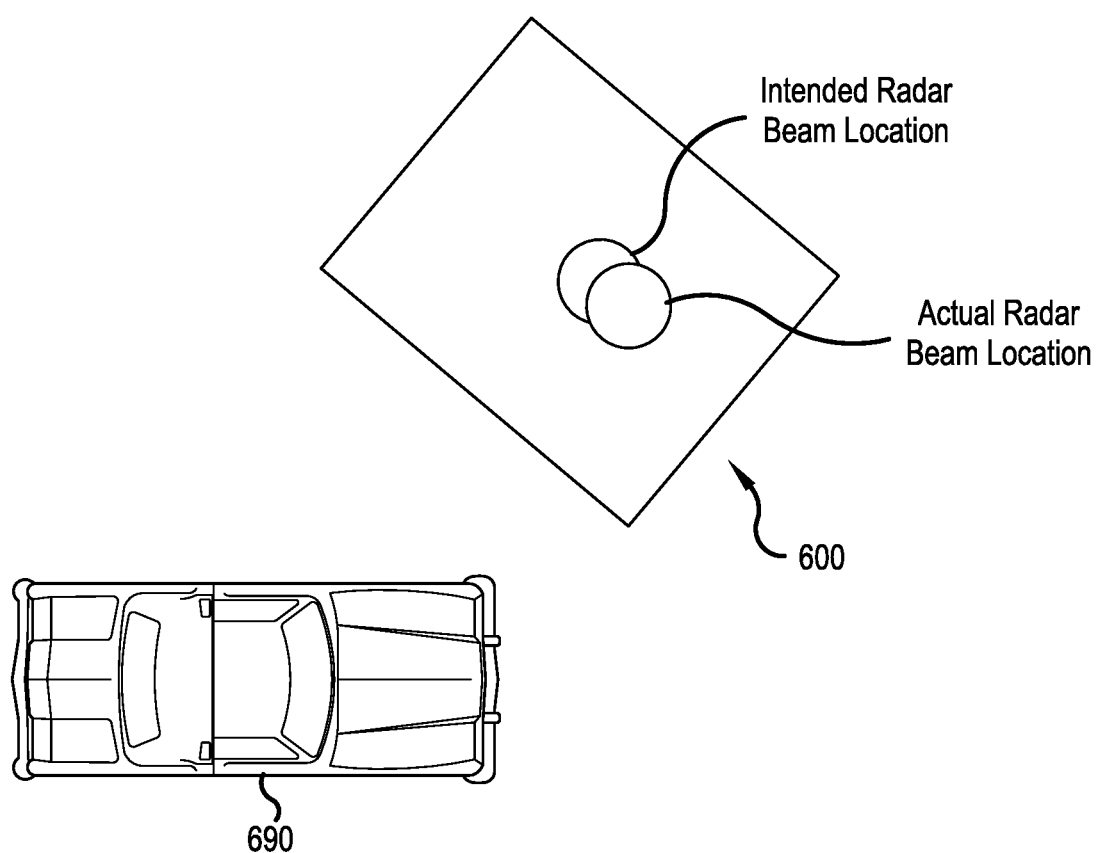
FIG. 6 illustrates a system for testing an installed automotive arrangement using the flow of FIG. 5 in a first use case, in accordance with a representative embodiment.

In detect mode, the transmit function for the radar of the car 590 is tested. This is illustrated in FIG. 6. In the transmit function, the computer/controller 560 sets all the diode biases to zero so that the antenna-diode pair array 100 acts as a millimeter-wave camera. The computer/controller 560 then "polls" the sense multiplexer 561 to scan the antenna-diode pair array 100, thereby collecting the sensed millimeter-wave power across the camera. Image information such as spot center, spot shape, etc. is compared with the desired ideal transmit beam, and if a discrepancy is deemed unacceptable, the antenna-diode pair array 100 can be adjusted to bring the transmitter into conformance or the software that controls the beam forming can be adjusted to correct for the measured offset. The adjusting (physical or software) may be performed by a technician or by the car 590 itself. The adjusting may be mechanical or electrical, or both, to bring the transmitter into conformance.

Figure 7:
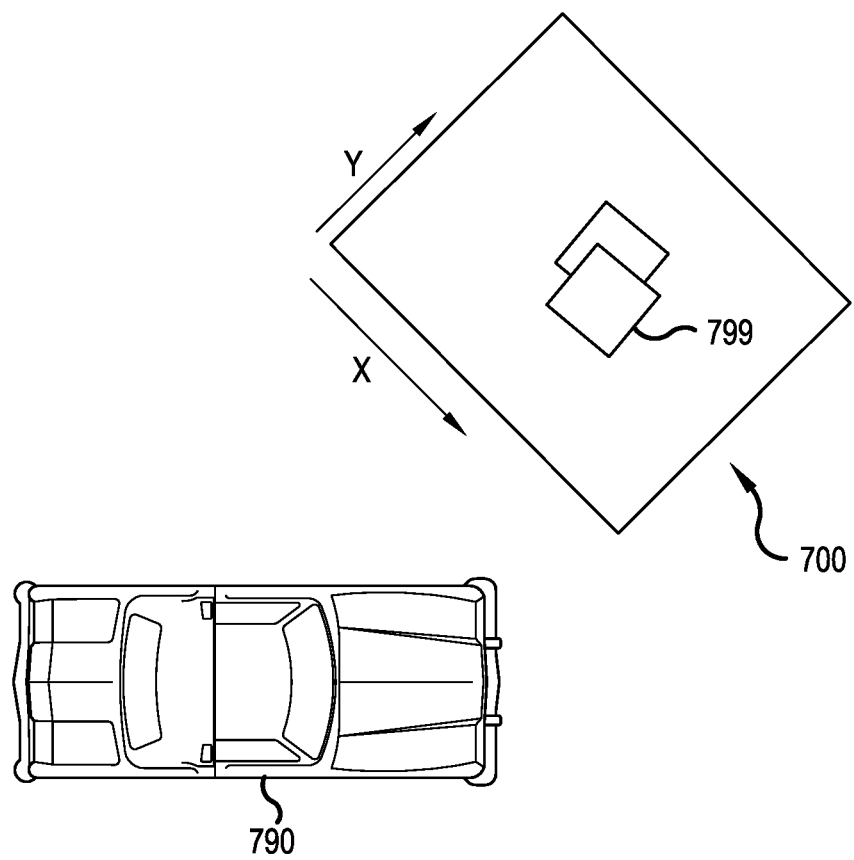
FIG. 7 illustrates a system for testing an installed automotive arrangement using the flow of FIG. 4 in a second use case, in accordance with a representative embodiment.

In reflect mode, DUT transmission and reception are both fully tested. This is illustrated in FIG. 7. In the reflect mode, the test system emulates a radar target at varying angles. For example, azimuth accuracy tests may be important to an automaker, so the computer/controller 560 may instruct the bias demultiplexer 562 to forward bias only the column in the antenna-diode pair array 100 corresponding to the target azimuth while leaving all other columns at zero bias to be nonreflecting. When both azimuth and elevation are targeted, the row and column bias select may be implemented through the bias demultiplexer 562. In the transmission and reception testing in reflect mode, the radar of the car 590 may be provided with a digital signal processor for digital signal processing (DSP) to infer target parameters such as distance, relative velocity, and angle. Determination of nonconformance and remediation of the nonconformance may be left to the automaker.

FIG. 6 illustrates a system for testing an installed automotive arrangement using the flow of FIG. 5 in a first use case, in accordance with a representative embodiment.

Since automotive radar antennas are often hidden behind plastic bumper material and the manufacturing tolerances of the plastic bumper parts are crude with respect to the wavelength (e.g., millimeter or microwave) of the radar, there may be some interaction with the bumper material that may alter the beam shape and position. However, it is important that the location of a detected object agrees with the actual physical position of the object.

In the embodiment of FIG. 6, a car radar is tested using antenna-diode pair array 100 to detect the radar RF stimulus. The radar is set to illuminate a single location rather than scanning. The actual location of the RF energy may be offset from the expected location due to interaction with the bumper material and rough manufacturing tolerances. The antenna-diode pair array 100 allows detection of the actual beam location and measurement of any undesired offsets. This essentially tests the transmit operation and RF beam alignment.

FIG. 7 illustrates a system for testing an installed automotive arrangement using the flow of FIG. 5 in a second use case, in accordance with a representative embodiment.

In the use case of FIG. 7, the ability for the antenna-diode pair array 100 to act as a programmable reflecting target for the automotive radar is shown. Unlike the receiver mode described previously which only tests the Radar DUT 499 transmitter, the approach in the embodiment of FIG. 7 tests both the Radar DUT 499 transmitter and receiver. When the diodes in the antenna array are forward biased they effectively short out those antenna and create a large reflection at the antenna position that the DUT can image. Two reflecting areas may be programmed to be spaced apart and brought closer and closer together to allow measuring the system resolution in X and Y dimensions. Having a programmable reflector capability allows full testing of the Radar DUT 499 for both transmit and reception.

Figure 8:
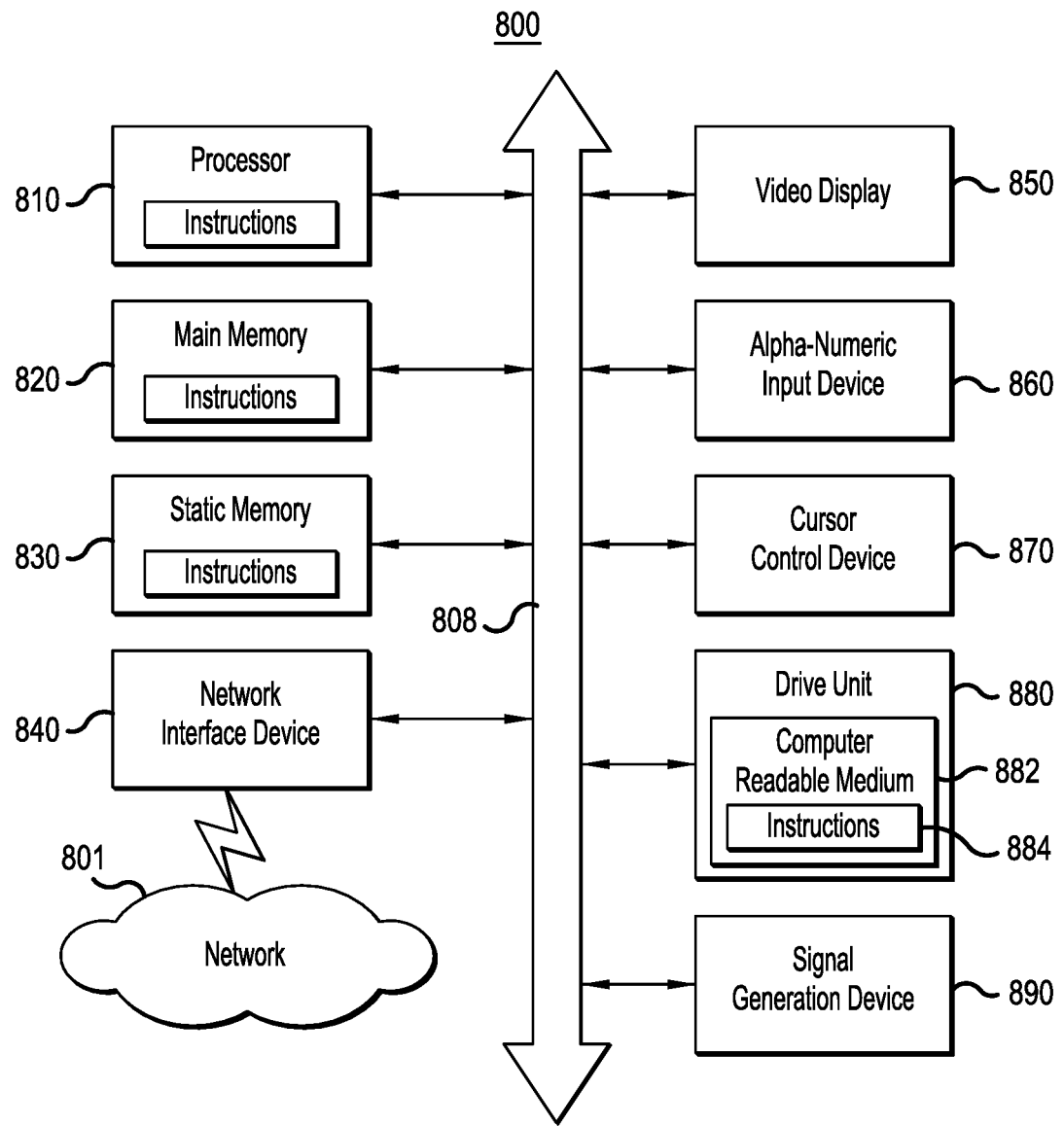
FIG. 8 illustrates a general computer system, on which a method of controlling the two-dimensional array of antenna-diode pairs can be implemented, in accordance with a representative embodiment.

FIG. 8 illustrates a general computer system, on which a method of controlling the two-dimensional array of antenna-diode pairs can be implemented, in accordance with a representative embodiment.

The computer system 800 can include a set of instructions that can be executed to cause the computer system 800 to perform any one or more of the methods or computer-based functions disclosed herein. The computer system 800 may operate as a standalone device or may be connected, for example, using a network 801, to other computer systems or peripheral devices. Any or all of the elements and characteristics of the computer system 800 in FIG. 8 may be representative of elements and characteristics of the computer/controller 560 in FIG. 5 or other similar devices and systems that can include a controller and perform the processes described herein. The computer In a networked deployment, the computer system 800 may operate in the capacity of a client in a server-client user network environment. The computer system 800 can also be fully or partially implemented as or incorporated into various devices, such as a central station, an imaging system, an imaging probe, a stationary computer, a mobile computer, a personal computer (PC), or any other machine capable of executing a set of instructions (sequential or otherwise) that specify actions to be taken by that machine. The computer system 800 can be incorporated as or in a device that in turn is in an integrated system that includes additional devices. In an embodiment, the computer system 800 can be implemented using electronic devices that provide video or data communication. Further, while the computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 includes a processor 810. A processor 810 for a computer system 800 is tangible and non-transitory. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. Any processor described herein is an article of manufacture and/or a machine component. A processor for a computer system 800 is configured to execute software instructions to perform functions as described in the various embodiments herein. A processor for a computer system 800 may be a general-purpose processor or may be part of an application specific integrated circuit (ASIC). A processor for a computer system 800 may also be a microprocessor, a microcomputer, a processor chip, a controller, a microcontroller, a digital signal processor (DSP), a state machine, or a programmable logic device. A processor for a computer system 800 may also be a logical circuit, including a programmable gate array (PGA) such as a field programmable gate array (FPGA), or another type of circuit that includes discrete gate and/or transistor logic. A processor for a computer system 800 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 800 includes a main memory 820 and a static memory 830 that can communicate with each other via a bus 808. Memories described herein are tangible storage mediums that can store data and executable instructions and are non-transitory during the time instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the computer system 800 may further include a video display unit 850, such as a liquid crystal display (LCD), an organic light emitting diode (OLED), a flat panel display, a solid-state display, or a cathode ray tube (CRT). Additionally, the computer system 800 may include an input device 860, such as a keyboard/virtual keyboard or touch-sensitive input screen or speech input with speech recognition, and a cursor control device 870, such as a mouse or touch-sensitive input screen or pad. The computer system 800 can also include a disk drive unit 880, a signal generation device 890, such as a speaker or remote control, and a network interface device 840.

In an embodiment, as depicted in FIG. 8, the disk drive unit 880 may include a computer-readable medium 882 in which one or more sets of instructions 884, e.g. software, can be embedded. Sets of instructions 884 can be read from the computer-readable medium 882. Further, the instructions 884, when executed by a processor, can be used to perform one or more of the methods and processes as described herein. In an embodiment, the instructions 884 may reside completely, or at least partially, within the main memory 820, the static memory 830, and/or within the processor 810 during execution by the computer system 800.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 882 that includes instructions 884 or receives and executes instructions 884 responsive to a propagated signal; so that a device connected to a network 801 can communicate video or data over the network 801. Further, the instructions 884 may be transmitted or received over the network 801 via the network interface device 840.

Accordingly, Millimeter-Wave Detect or Reflect Array enables selective reflecting of an incident microwave signal or millimeter-wave signal, by providing each antenna of the antenna-diode pair array 100 with an input adapted to selectively receive a forward bias signal or a zero bias or a reverse bias signal to apply to each of the diodes 120. This allows selective control of the antenna-diode pair array 100 to operate as a detector that detects an incident microwave signal or millimeter wave signal, or to operate as a reflector that reflects the incident microwave signal or millimeter wave signal.

Figure 9:
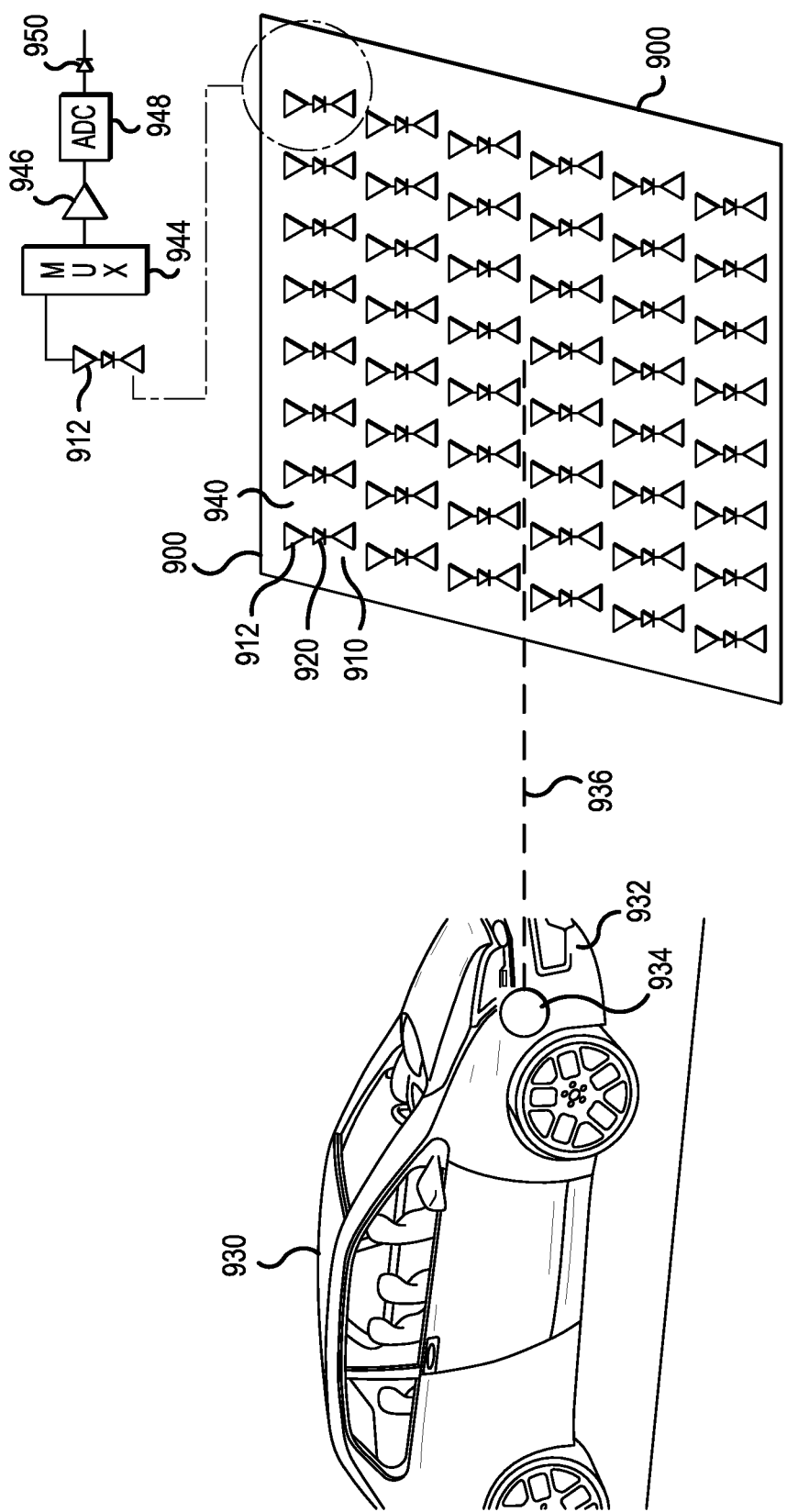
FIG. 9 illustrates an arrangement for determining angle of incidence of a radar signal in accordance with a representative embodiment.

FIG. 9 illustrates an arrangement for determining angle of incidence of a radar signal in accordance with a representative embodiment. Many aspects and details of the various components of the system 900 are common to similar components discussed above in connection with various representative embodiments. These common aspects and details may not be repeated in order to avoid obscuring the presently described representative embodiment.

During operation, a vehicle 930 is equipped with a radar system (not shown in FIG. 9) having at least a portion of its components disposed in its front bumper 932. In the representative embodiment, a portion of the radar system including transmit and receive antennae and electronics are provided at a curved portion 934 of the front bumper 932.

Radar signals are emitted from the radar system of the vehicle 930, and are incident on a array 940 of antenna-diode pairs 910, or rectennae, each including an antenna 912 and a diode 920. While various aspects of the testing of the radar in various embodiments are germane to the present description, the presently described representative embodiment usefully fosters testing of a radar system that transmits and receives radar signals 936 from the curved portion 934 of the front bumper 932.

Determining the angle of arrival requires properly orienting the array of the car under test. A visible laser emitting (not shown) perpendicularly from the center of the panel of rectennas would allow repeatable alignment. A laser emitting perpendicularly from the array onto a calibration fiducial on the car would ensure the panel is at the proper angle with respect to the car fiducial.

Another feature of the system of FIG. 9 is the optional inclusion of LEDs to display the received microwave or millimeter wave field strengths over the panel area. Specifically, as shown in FIG. 9 for one of the antenna-diode pairs 910, the rectified DC output the antenna-diode pair 910 is provided to an analog multiplexer (MUX) 944. The output from the MUX 944 is provided an analog to digital converter (ADC) 948, where the DC value of the detected microwave or millimeter wave field, or the microwave or millimeter wave envelope is provided. The output from the ADC 948 is provided to an LED 950. As will be appreciated, an LED 950 can be associated with each antenna-diode (rectenna) 910 of the array 940. Moreover, the electronic components used to drive the LEDs 950 this can be located away from the antenna-diode pairs 910, for example at an edge of the antenna array for example.

If the detected DC signal level from the ADC 948 is above a predetermined threshold value then a current is sent to the associated LED 950, which then illuminates. The brightness of the output from the LED 950 is proportional to the received microwave or millimeter wave field strength, and as such, the intensity of the output of the LED 950 can be used as a measure of the incident field strength from the radar of the vehicle 930. Notably, the LED 950 may be a programmable color LED, and the output from the LED 950 can be used to color-code or intensity-encode a programable color LED to produce live color-coded field strength map. Among other benefits, the inclusion of LEDs 950 provide the user a live view of the detected microwave or millimeter wave field strength over the area covered by the array 940.

Figure 10A:
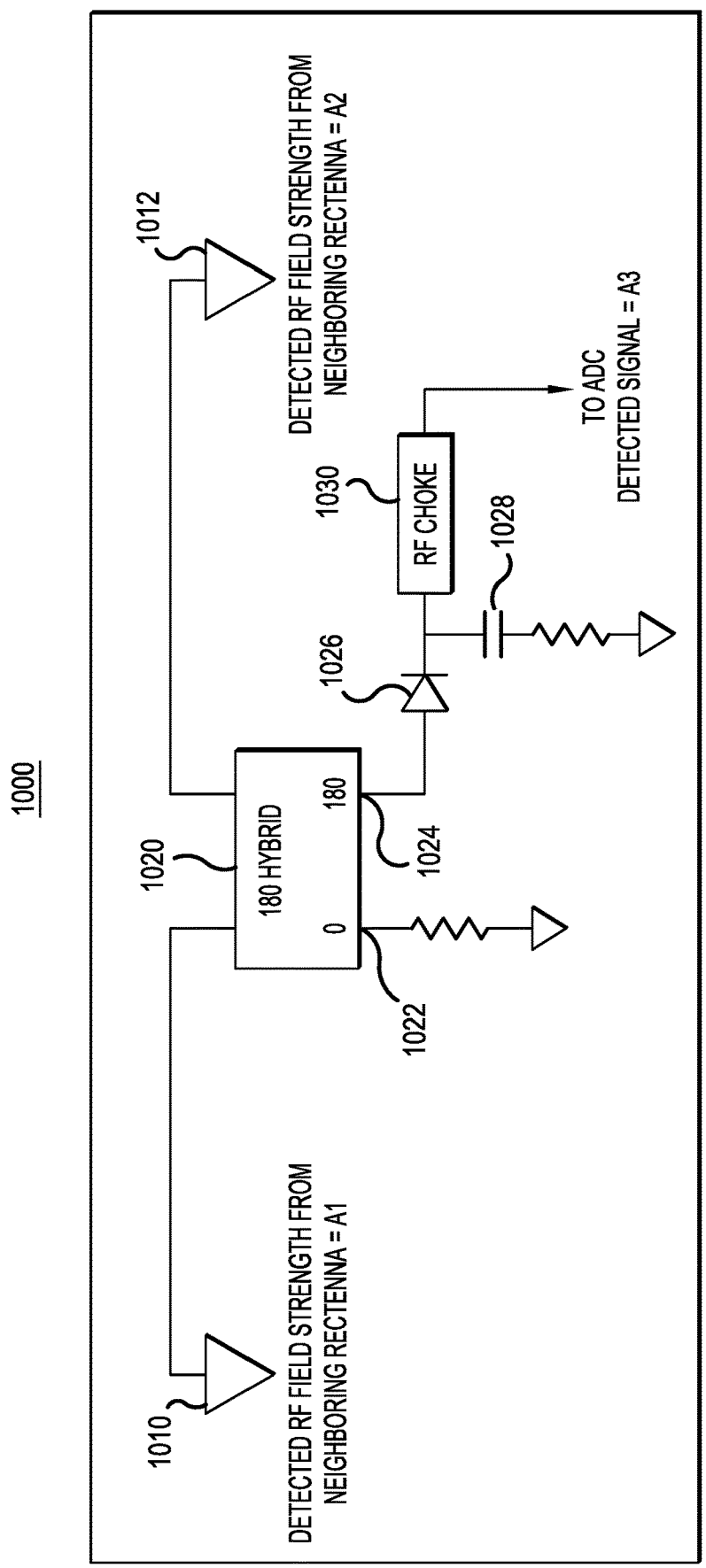
FIG. 10A illustrates a simplified schematic diagram of a circuit for determining an angle of incidence of a radar signal from a device under test (DUT).

FIG. 10A illustrates a simplified schematic diagram of a circuit 1000 for determining an angle of incidence of a radar signal from a device under test (DUT). Many aspects and details of the antenna array 1100 are common to those described above in connection with various representative embodiments. These aspects and details may not be repeated to avoid obscuring the presently described representative embodiment.

In accordance with a representative embodiment, the circuit 1000 may be a component of the array 940 of antenna-diode pairs 910, or may be a separate component for use with the system 900.

The circuit 1000 comprises a 180° hybrid 1020 that having two inputs ports on top and two output ports, a summing port (0) 1022 and a difference port (180) 1024, on the bottom. Microwave or millimeter wave signals from a pair of patch antennas (not shown in FIG. 10A) of the array 940 of antenna-diode pairs 910 are routed through 180° hybrid 1020, which subtracts the radar (microwave or millimeter wave) signals from the vehicle 930. A difference of the radar signals of the neighboring pair of patch antennas is thus provided. As described below, this difference is provided to a rectifying diode 1026, and the microwave or millimeter wave angle-of-arrival (see FIG. 10C) can be measured. This technique requires knowing the impinging microwave or millimeter wave amplitude at both antenna 1010 and antenna 1012, and thus the field strength at both antennae 1010, 1012 connected to the inputs to the 180 degree hybrid 1020 must be known to allow extraction of the angle of arrival, which can be directly measured using rectennas neighboring antennae 1010 and 1012 (rectennas not shown).

As shown, the circuit 1000 also comprises a known microwave or millimeter wave rectification circuit with low pass filtering prior to the ADC. The series RC 1028 provides a path to ground but looks "open" to a low frequency signal; the choke 1030 blocks microwave or millimeter wave signals but passes the low frequency/DC signals.

Referring to FIG. 10A, and as discussed more fully below, A1 is the rectified signal from a neighboring rectenna (not shown in FIG. 10A) to the antenna 1010, and is proportional to the microwave or millimeter wave field strength at antenna 1010 feeding the hybrid 1020. A2 is the rectified signal from another neighboring rectenna (not shown in FIG. 10A) to the antenna 1012, and is proportional to the microwave or millimeter wave field strength at the antenna 1012 feeding the hybrid 1020. As described presently, knowing A1 and A2 is useful for the extraction of the angle of arrival of the incoming microwave or millimeter wave beam.

Figure 10B:
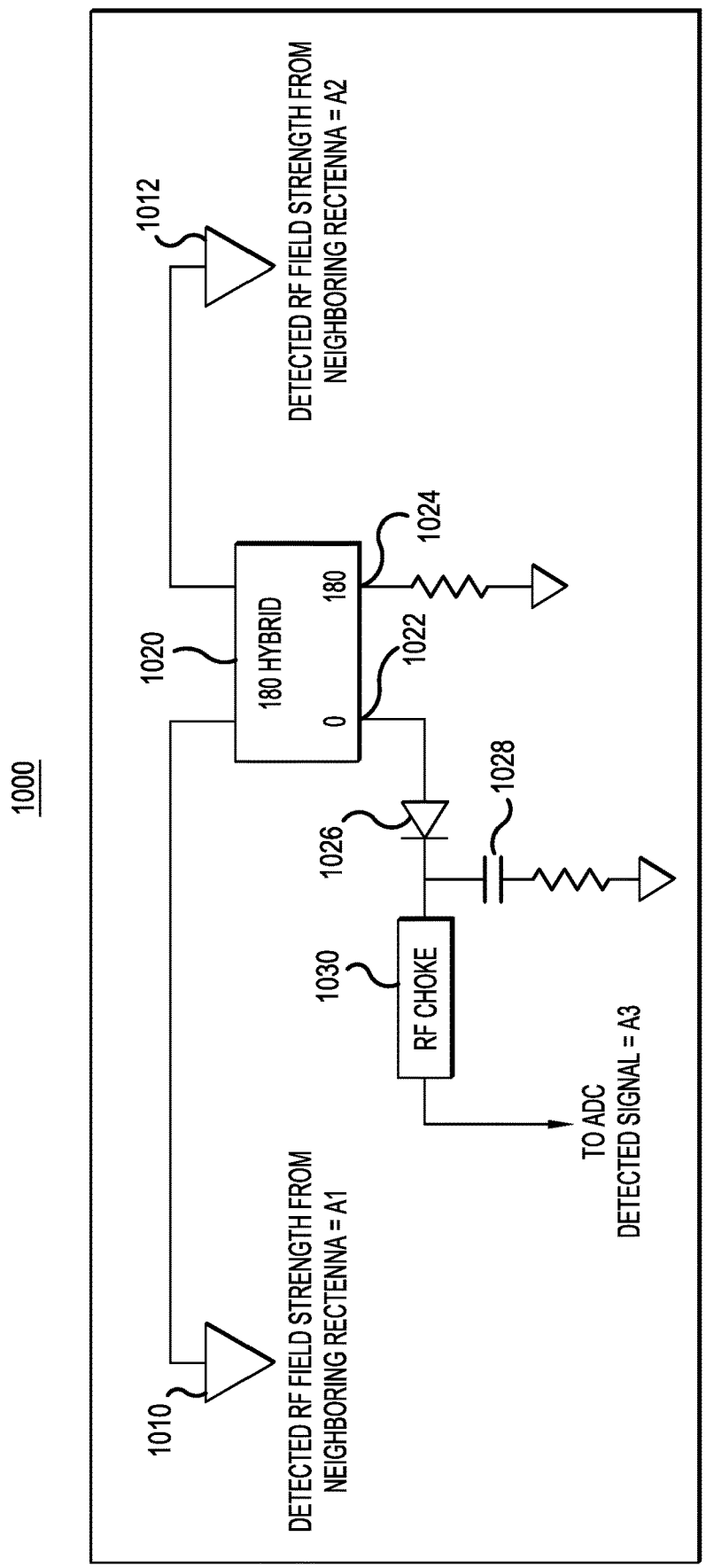
FIG. 10B illustrates a simplified schematic diagram of a circuit for determining an angle of incidence of a radar signal from a device under test (DUT).
Figure 10C:
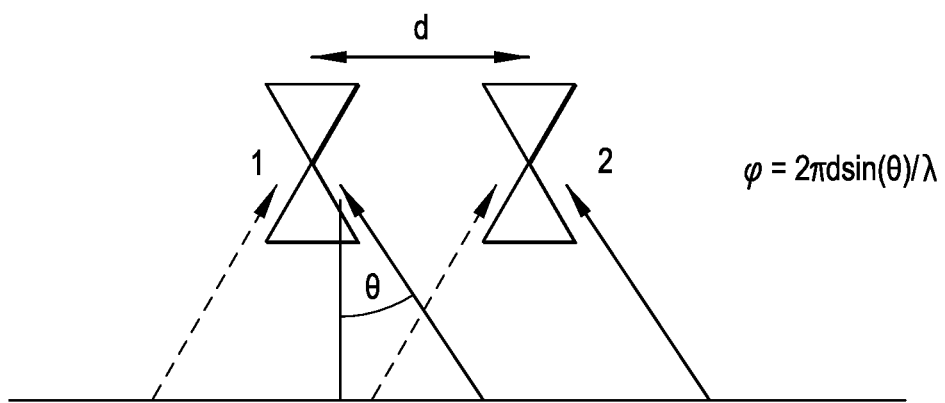
FIG. 10C illustrates angle of incidence of incident millimeter wave or microwave signals at two neighboring antennae in accordance with a representative embodiment.

With reference to FIGS. 10A and 10C, E1 is the microwave or millimeter wave field amplitude at wavelength λ provided to antenna 1010, E2 is the microwave or millimeter wave field amplitude at wavelength λ provided to antenna 1012, and φ is the relative phase of these microwave or millimeter wave signals the outputs A1, A2 and A3 are given by:

$$A1 = E_1^2;$$

$$A2 = E_2^2; \text{ and}$$

$$A3 = E_1^2 + E_2^2 - 2E_1 E_2 \cos(\varphi),$$

where $\varphi_2 = 2\pi d \sin(\theta)/\lambda$.

The measured diode outputs A1, A2 from respective neighboring rectennae, and output A3 from rectifying diode 1026 are used to solve for E1, E2, and cos(φ). Notably, φ is the relative phase between the microwave or millimeter wave signals incident on the antenna 1010 and antenna 1012. Since cosine is an even function, equations A1-A3 are not discerned by solid arrows from the dashed arrows FIG. 10B, because −θ produces the same cos(φ) as θ. As will be appreciated from equations A1-A3, if A1-A3 are known, cos(φ) is also known. From the trigonometric identity that cos(φ)=cos(−φ) and the fact that φ=2πd sin(θ)/λ, equations A1-A3 do not distinguish the incidence angle θ from −θ, because sin(−θ)=−sin(θ). However, knowledge of the radar's mounting position on the car plus the detection "hot spot" pattern on the array provides sufficient information to decide which choice of angle (θ vs. −θ) agrees with the measurements. Specifically, the angle of arrival circuit cannot distinguished between microwave or millimeter wave coming in at θ vs −θ. But one angle (θ or −θ) can be eliminated by where the microwave or millimeter wave is incident on the array 940. One arrival angle (either θ or −θ) will be consistent with the detected beam center from the array of detectors, and one will not.

FIG. 10B illustrates a simplified schematic diagram of a circuit for determining an angle of incidence of a radar signal from a device under test (DUT). Many aspects and details of the representative embodiment depicted in FIG. 10B are common to those described in connection with FIGS. 1-10A and FIG. 10C, and may not be repeated.

The circuit 1000 comprises a 180° hybrid 1020 having two inputs ports on top and two output ports, a summing port (0) 1022 and a difference port (180) 1024, on the bottom. By routing microwave or millimeter wave signals from a pair of patch antennas through a 180° hybrid, which adds the radar (microwave or millimeter wave) signals from the vehicle 930, and detecting the sum output with a rectifying diode 1026, a microwave or millimeter wave angle-of-arrival (see FIG. 10C) can be measured. As with the embodiment described in connection with FIG. 10A, this technique requires knowing the impinging microwave or millimeter wave amplitude at both antenna 1010 and antenna 1012, and thus the field strength at both antennae 1010, 1012 connected to the inputs to the 180 degree hybrid 1020, to determined of the angle of arrival.

Again, the circuit 1000 also comprises a known microwave or millimeter wave rectification circuit with low pass filtering prior to the ADC. The series RC 1028 provides an path to ground but looks "open" to a low frequency signal; the choke 1030 blocks microwave or millimeter wave signals but passes the low frequency/DC signals.

Referring to FIG. 10B, and as discussed above, A1 is the rectified signal from a neighboring rectenna (not shown in FIG. 10B) to the antenna 1010, and is proportional to the microwave or millimeter wave field strength at antenna 1010 feeding the hybrid 1020. A2 is the rectified signal a neighboring rectenna (not shown in FIG. 10B) to the antenna 1012 proportional to the microwave or millimeter wave field strength at the antenna 1012 feeding the hybrid 1020. As described presently, knowing A1 and A2 allows extraction of the angle of arrival of the incoming microwave or millimeter wave beam.

With reference to FIGS. 10B and 10C, E1 is the microwave or millimeter wave field amplitude at wavelength λ provided to antenna 1010, E2 is the microwave or millimeter wave field amplitude at wavelength λ provided to antenna 1012, and φ is the relative phase of these microwave or millimeter wave signals the outputs A1, A2 and A3 are given by:

$$A1 = E_1^2;$$

$$A2 = E_2^2; \text{ and}$$

$$A3 = E_1^2 + E_2^2 + 2E_1E_2 \cos(\varphi),$$

where $\varphi = 2\pi d \sin(\theta)/\lambda$.

The measured diode outputs A1, A2 from respective neighboring rectennae, and output A3 from rectifying diode 1026 allows us to solve for E1, E2, and cos(φ). Notably, φ is the relative phase between the microwave or millimeter wave signals incident on the antenna 1010 and antenna 1012. Since cosine is an even function, equations A1-A3 are not discerned by solid arrows from the dashed arrows FIG. 10B, because −θ produces the same cos(φ) as θ. As will be appreciated from equations A1-A3, if A1-A3 are known, cos(φ) is also known. From the trigonometric identity that cos(φ)=cos(−φ) and the fact that φ=2πd sin(θ)/λ, equations A1-A3 do not distinguish the incidence angle θ from −θ, because sin(−θ)=−sin(θ). Again, knowledge of the radar's mounting position on the car plus the detection "hot spot" pattern on the array provides sufficient information to decide which choice of angle (θ vs. −θ) agrees with the measurements. Specifically, the angle of arrival circuit cannot distinguish between microwave or millimeter wave coming in at θ vs −θ. But one angle (θ or −θ) can be eliminated by where the microwave or millimeter wave is incident on the array 940. One arrival angle (either θ or −θ) will be consistent with the detected beam center from the array of detectors, and one will not.

Figure 11:
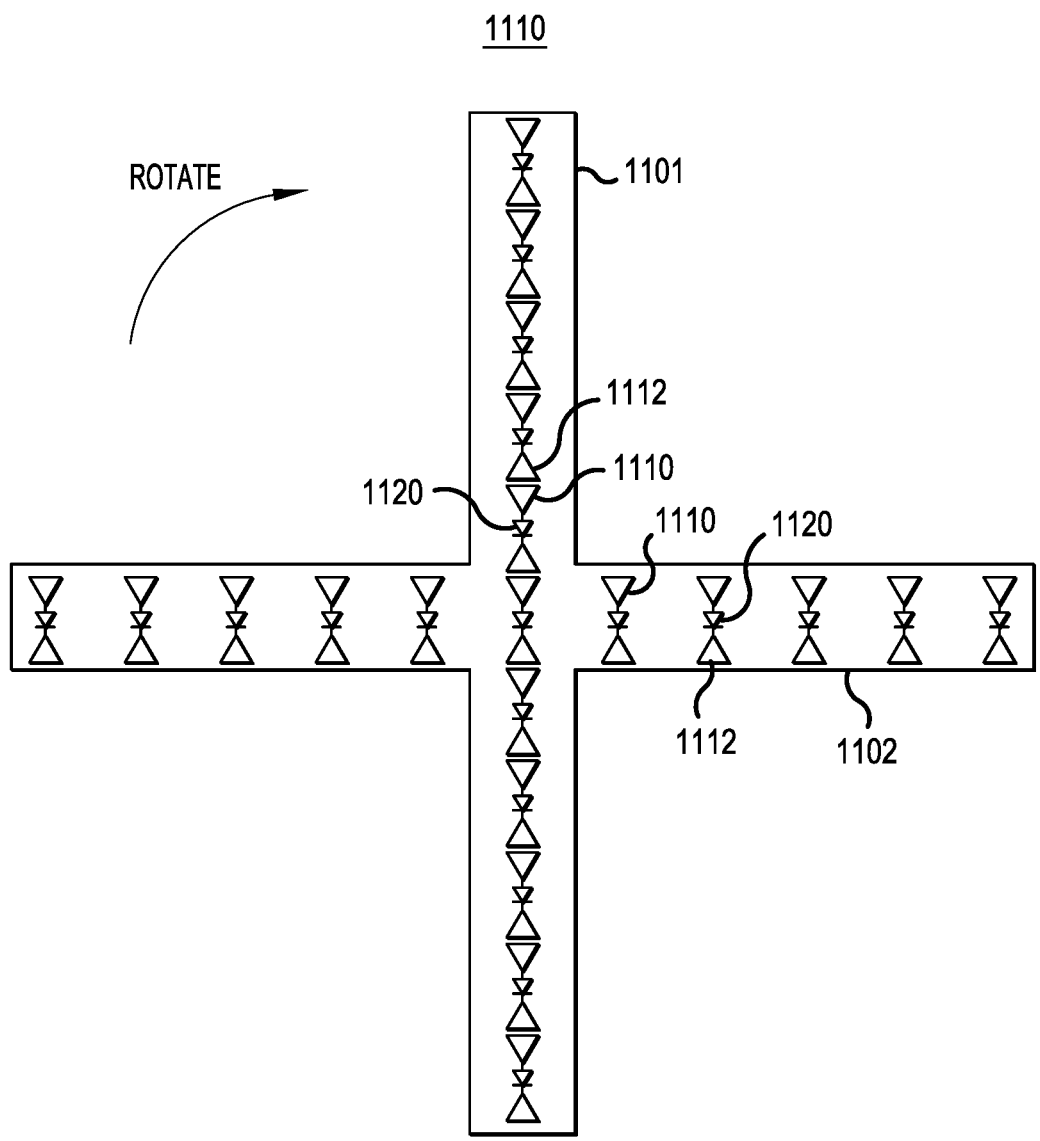
FIG. 11 illustrates a rectenna device in accordance with another representative embodiment.

FIG. 11 illustrates an antenna array 1100 in accordance with another representative embodiment. Many aspects and details of the antenna array 1100 are common to those described above in connection with various representative embodiments. These aspects and details may not be repeated to avoid obscuring the presently described representative embodiment.

The antenna array 1100 beneficially provides a possible lower cost implementation would be to use just a strip of rectennas and physically rotate the strip to cover a circular area. In operation, the first linear array 1101 rotates as shown.

The antenna array 1100 includes a first linear array 1101 of antenna-diode pairs 1110, each including an antenna 1112 and a diode 1120. The antenna array 1100 also includes a second linear array 1102 of antenna-diode pair 1110, each including an antenna 1112 and a diode 1120.

As will be appreciated, the same area as an array with multiple rows and columns can be measured with the square-root of the numbers of antenna-diode pair 1110 (rectenna elements). As describe above, LEDs may be used to display the measured fields. However, the display LEDs would need to be modulated fast enough and in synchronicity with the rotation to create the correct visual image.

The polarization of the antennae 1112 is the direction of the microwave or millimeter wave electric field vector. A pair of antennae one from the first linear array 1101 and one from the second linear array 1102 is needed to accurately measure the field strength of an arbitrarily aligned microwave or millimeter wave field. For example, should the microwave or millimeter wave field be horizontally polarized, then first linear array 1101 and second linear array 1102 will match this polarization at moments in time when they are rotated 90° from the moment depicted in FIG. 11. As such, and each antenna of the first and second linear arrays 1101, 1102 has a desired polarization at a 50% duty cycle. First and second linear arrays 1101, 1102 are adapted to rotate around a common axis, and at a moment in time, the first linear array 1101 (a first plurality of antennae) and the second linear array 1102 (a second plurality of antennae) are co-polarized.

Although a millimeter-wave detect or reflect array has been described with reference to several exemplary embodiments, it is understood that the words that have been used are words of description and illustration, rather than words of limitation. Changes may be made within the purview of the appended claims, as presently stated and as amended, without departing from the scope and spirit of millimeter-wave detect or reflect array in its aspects. Although Millimeter-millimeter-wave detect or reflect array has been described with reference to particular components, materials and embodiments, the millimeter-wave detect or reflect array is not intended to be limited to the particulars disclosed; the millimeter-wave detect or reflect array of the present teachings extends to all functionally equivalent components, structures, methods, and uses such as are within the scope of the appended claims.

The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed:

1. A device for detecting and selectively reflecting an incident microwave signal or millimeter-wave signal, the device comprising:
    a plurality of antennae disposed in an array;
    a diode disposed at each input of each antenna, each diode having an input adapted to selectively receive a reverse bias signal, or a zero bias signal, or a forward bias signal; and a switching device connected to each input, and configured to selectively apply the forward bias signal, or the reverse bias signal or the zero bias signal to each of the diodes, wherein in forward bias, each of the plurality of antennae reflects the incident microwave signal or millimeter wave signal, and in zero bias or reverse bias each of the plurality of antennae detects the incident microwave signal or millimeter wave signal.

2. The device of claim 1, further comprising: a 180° hybrid circuit disposed between a pair of antennae, wherein an output of the 180° hybrid circuit is indicative of an angle of arrival of the incident microwave signal or millimeter wave signal.

3. The device of claim 2, wherein one output of the 180° hybrid circuit is provided to a rectifying diode to provide a DC output proportional to a difference between outputs of two of the plurality of antennae.

4. The device of claim 2, wherein one output of the 180° hybrid circuit is provided to a rectifying diode to provide a DC output proportional to a sum of inputs of outputs of two of the plurality of antennae.

5. The device of claim 1, wherein the diode disposed at each input of each antenna is a zero bias Schottky diode.

6. The device of claim 5, wherein the plurality of antennae in each of a series of columns are adapted to be addressed by the switching device as addressed columns.

7. The device of claim 6, wherein in forward bias the addressed columns reflect the incident microwave signal or millimeter wave signal.

8. The device of claim 6, wherein in zero bias the addressed columns detect the incident microwave signal or millimeter wave signal.

9. The device of claim 1, wherein the array comprises a series of rows and a series of columns.

10. The device of claim 9, wherein the plurality of antennae in each of the series of rows are addressable by the switching device as addressed rows.

11. The device of claim 9, wherein in forward bias addressed rows reflect the incident microwave signal or millimeter wave signal.

12. The device of claim 9, wherein in zero bias addressed rows detect the incident microwave signal or millimeter wave signal.

13. The device of claim 1, further comprising:
a delay line adapted to receive the incident microwave signal or millimeter wave signal to emulate a distance.

14. The device of claim 1, wherein each of the plurality of antennae are spaced from one another by a distance that is approximately $\lambda/4$, where $\lambda$ is a wavelength of the incident microwave signal or millimeter wave signal.

15. The device of claim 1, wherein each of the plurality of antennae are spaced from one another by a distance that is approximately $\lambda/2$, where $\lambda$ is a wavelength of the incident microwave signal or millimeter wave signal, and a device under test (DUT) transmits a single beam.

16. The device according to claim 1, wherein each input is disposed at a center-tap of each of the antennae.

17. The device according to claim 16, wherein only a direct current voltage is measured at the center-tap.

18. The device according to claim 17, wherein a magnitude of the direct current voltage is proportional to the magnitude of the incident microwave signal or millimeter wave signal.

19. The device according to claim 1, further comprising a plurality of arrays of antennae, wherein each of the plurality of arrays of antennae are substantially flat.

* * * * *